June 8, 1965 I. MATTES 3,187,431
KNIFE WITH EXCHANGEABLE BLADE AND HANDLE FOR THE KNIFE
Filed Aug. 1, 1963
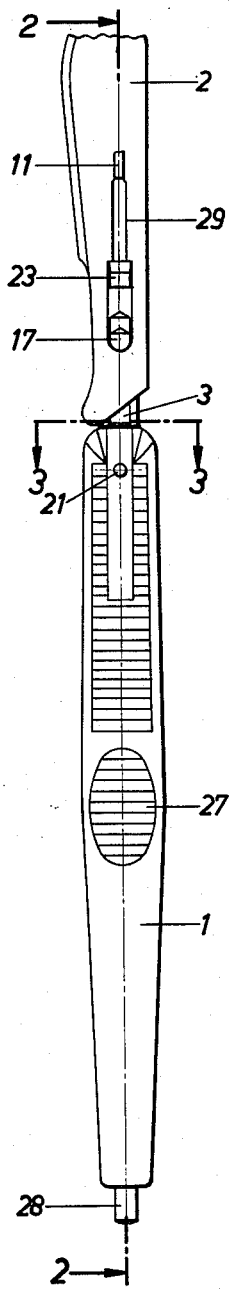
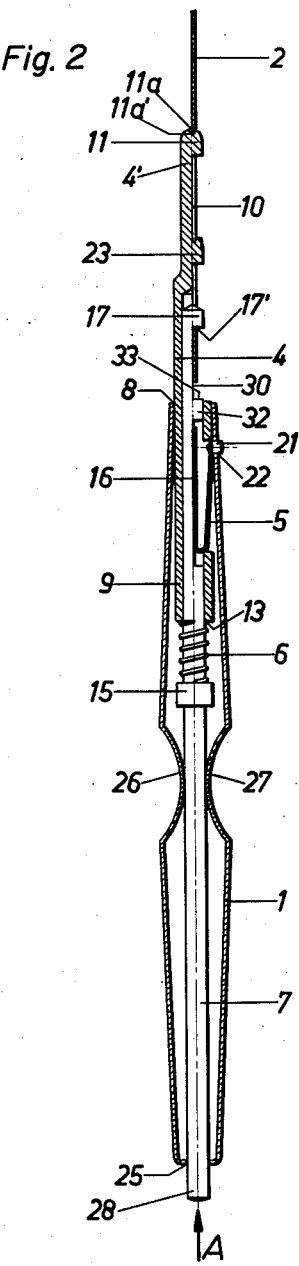
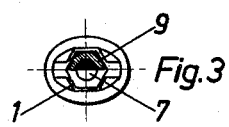
Inventor
Irmgard Mattes
by
Michael J. Striker

3,187,431
KNIFE WITH EXCHANGEABLE BLADE AND HANDLE FOR THE KNIFE
Irmgard Mattes, Bahnhofstrasse 129, Tuttlingen, Wurttemberg, Germany
Filed Aug. 1, 1963, Ser. No. 299,324
11 Claims. (Cl. 30—339)

The present invention relates to a surgical knife with exchangeable blade and especially to the handle for such a knife.

It is an object of the present invention to provide for a handle for a surgical knife with exchangeable blade which is constructed in such a manner that the blade may be properly secured to the handle and released therefrom while the user grips the handle with one hand without the necessity of gripping the blade with the other hand or any other instrument.

It is an additional object of the present invention to provide for such a handle which is composed only of a few and relatively simple parts so that the same can be produced at very reasonable cost while standing up properly under extensive use.

It is a further object of the present invention to provide for such a handle in which the various parts can be easily taken apart for proper cleaning and/or replacement.

With these objects in view the knife handle according to the present invention mainly comprises elongated handle means, first blade engaging means on the handle means and adapted to extend through an aperture in a blade to be exchangeably connected to the handle and in which the first engaging means have a first abutment surface extending transversely to the elongation of the elongated handle means. The handle comprises further elongated operating means connected to the handle means for relative sliding movement in longitudinal direction and the elongated operating means are provided with second blade engaging means spaced in longitudinal direction from the first engaging means and likewise adapted to extend through the apertured blade. The second blade engaging means have a second abutment surface extending transverse to the longitudinal direction of the elongated operating means and facing away from the first abutment surface. Spring means are operatively connected to the handle means and to the operating means and biased to move the latter in longitudinal direction so as to move the second abutment surface away from the first abutment surface. The elongated operating means have an operating portion engageable by the user of the handle to move the operating means in longitudinal direction against the force of the spring means in a direction in which the abutment surfaces approach each other so that the engaging means and the abutment surface thereon may be brought closer together and so that the engaging means be extended through an apertured blade, whereby upon subsequent release of the operating portion the abutment surfaces will be moved again away from each other by the spring means and into engagement with opposite longitudinally spaced aperture portions in the blade so that the latter will be securely held on the blade engaging means.

The handle means are preferably formed by an elongated handle body formed with a bore extending in longitudinal direction therethrough and an elongated blade supporting member having a front portion projecting beyond one end of the handle body and a rear portion located in the bore of the handle body. In this arrangement the operating means is preferably in the form of an operating rod extending through the bore of the body and projecting with a rear operating portion thereof beyond the other end of the handle body.

Preferably the elongated blade supporting member is releasably fastened to the handle body so that the two components forming the handle means may be easily connected to and disconnected from each other for proper cleaning purposes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side view of the knife handle according to the present invention with the blade attached thereto;

FIG. 2 is a longitudinal cross section taken along line 2—2 of FIG. 1; and

FIG. 3 is a cross section taken along line 3—3 of FIG. 1.

Referring now to the drawings, and particularly to FIGS. 1 and 2, it will be seen that the handle means according to the present invention comprise an elongated handle body 1 formed with a bore extending in longitudinal direction therethrough and an elongated blade supporting member 4 having a front portion 4' projecting beyond the open end 8 of the handle body 1 and a rear portion 9 located in the bore of the handle body 1 and formed with a bore 13 therethrough. The elongated blade supporting member 4 is preferably connected to the elongated handle body 1 by releasable fastening means comprising a small button 21 extending through a transverse bore 22 formed in the handle body 1 adjacent the open end 8 thereof and connected to a folded leaf spring 5 extending through a cutout 16 in the rear portion 9 of the elongated blade supporting member.

The handle according to the present invention includes further elongated operating means in the form of an elongated rod 7 extending through the bore 13 in the rear portion of the elongated blade supporting member 4 and through the interior of the handle body 1 to project with a front end portion 3 beyond the open front end 8 of the handle body and with a rear operating portion 28 beyond the open rear end 25 of the handle body 1. The operating rod 7 is guided in the bore 13 in the rear portion 9 of the blade supporting member 4 and at the rear end 25 of the handle body 1 for sliding movement in longitudinal direction. Rod 7 is provided with a shoulder portion 15 arranged rearwardly spaced from the rear end of the blade supporting member 4, and a coil compression spring 6 is arranged around the portion of the rod located between the rear end of the blade supporting member 4 and the shoulder portion 15 to abut with opposite ends thereof against this rear end and the shoulder portions 15. The coil spring 6 therefore tends to move the operating rod 7 in longitudinal direction so that the rear operating end 28 thereof will project beyond the open rear end 25 of the handle body 1. The inner surface of the handle body 1 adjacent the open front end 8 thereof has a non-circular, for instance, elliptical, configuration, as best seen in FIG. 3, and the rear portion 9 of the blade supporting member 4 has likewise a non-circular, for instance, hexagonal outline, as shown in FIG. 3, so that turning of the blade supporting member 4 relative to the handle body 1 about a longitudinal axis is prevented. The front end portion of the blade supporting member 4 has a flat side face 10 and a blade engaging means in form of a holding nose 11 projects laterally from the side face 10 at the outer free end of the blade supporting member 4. A second blade engaging means in form of a second holding nose 17 is provided on the front end of the operating rod 7 projecting laterally from a flat side face 30 formed in the front portion 3 of the operating rod 7. The side faces 10 and 30 are located in one plane and the inner arm of the folded leaf spring 5 abuts against the side faces 10 and 30 of the operating rod 7 thus preventing turning of the operating rod 7 about its longitudinal axis and maintaining the side faces 10 and 30 aligned in one plane. The first holding nose 11 is formed with a transverse slot 11a open toward the front end of the blade supporting member 4 and the bottom faces 11a' of the slot forms a first abutment surface. The second holding nose 17 is formed with a second abutment surface 17' extending substantially normal to the side face 30 and facing away from the first abutment surface 11a'. The holding noses 11 and 17 extend through an elongated slot 29 formed in the blade 2 which abuts with a side face thereof against the side faces 10 and 30 of the blade supporting member 4 and the operating rod 7, respectively.

The blade supporting member 4 may also be provided with an additional holding nose 23 rearwardly spaced from the first holding nose 11 and projecting from the side face 10 through the slot 29 in the blades 2. In this case the slot 29 preferably has a rear portion which is wider than the front portion thereof and the width of the holding noses 11, 23 and 17 are made to fit snugly into the corresponding width of the portions of the slot 29. The abutment face 17' of the holding nose 17 may be formed along a semicircle to correspond to the transverse face portion at the rear of the slot 29. The operating rod 7 may also be provided rearwardly spaced from the holding nose 17 with a projection 32 projecting laterally from the side face 33.

The handle body 1 is preferably provided on opposite faces thereof with depressions 26 and 27, respectively, to improve the grip on the handle.

The operation of the handle will be self-evident from the above description. When the blade 2 is not attached to the handle, the compression spring 6 will force the operating end 28 to a greater extent out of the open end 25 of the handle body 1 than shown in FIGS. 1 and 2. In this position the free end of the inner arm of the leaf spring 5 will abut against the bottom face of the projection 32. The curved rear end of the leaf spring 5 engages a transverse wall portion formed by the cutout 16 in the rear portion of the blade supporting member 4 and thus prevents longitudinal movement of the rear portion 9 of the blade supporting member 4 out of the handle body 1 under the action of the compression spring 6. When the blade 2 is not engaged by the holding noses 11 and 17 the abutment surfaces 11a' and 17' on these holding noses will be spaced in longitudinal direction to a greater extent than shown in FIGS. 1 and 2. If the handle is now gripped with one hand, whereby the middle finger and the pointing finger may be located in the depressions 26 and 27, and the rear end of the operating portion 28 of the rod 7 is engaged by the thumb and pressed in direction of the arrow A, the operating rod 7 will be moved in direction of this arrow against the force of the compression spring 6 and the abutment surfaces 11a' and 17' may be brought closer than shown in FIGS. 1 and 2 so that the holding noses 11 and 17 may be extended through the slot 29 formed in the blades 2 until the side faces 10 and 30 respectively abut agtinst one side face of the blade. During this operation the blade is preferably held in a stand or other supporting means which permit extension of the noses 11, 17, 23 through the slots of the blade. When pressure on the operating end 28 of the rod is then released, the operating rod 7 will be moved by the force of the compression spring 6 in direction opposite to the direction of the arrow A so that the abutment faces 11a' and 17' will respectively engage opposite transverse end portions of the slot 29 and thus hold the blade 2 securely on the handle. The whole operation can be performed with one hand and thereby the blade can be picked up from an appropriate stand without requiring any separate handling of the blade.

Pressure on the front edge of the blade during use will not cause longitudinal shifting of the blade supporting member 4 relative to the handle body 1, since button 21 held in bore 22 engages a transverse edge of the cutout 16 as clearly shown in FIG. 2.

When it is desired to eject the blade 2 from the handle, the operator will exert pressure in the direction of the arrow A on the operating portion 28 of the operating rod 7 until the projections 32 engage the rear or bottom end of the blade so that the blade is moved in forward or upward direction out of the slot 11a in the holding nose 11 whereafter the blade 2 is released from the blade supporting member 4.

The blade may also be provided instead of an elongated slot 29 with two spaced apertures respectively adapted to receive the holding noses 11 and 17. If the handle is used in cooperation with the blade provided with a pair of longitudinally spaced apertures, the additional holding nose 23 is omitted. In this construction the apertures in the blade have to have at least in longitudinal direction a cross section slightly larger than the longitudinal extension of the holding noses 11 and 17.

The various components of the handle are constructed in such a manner that the same can be easily taken apart for cleaning purposes. Such a disassembly of the handle in its various components may be easily performed by pressing the bottom 21 inwardly out of the bore 22 formed in the handle body, whereupon the rear portion 9 of the blade supporting member 4 may be pulled out together with the operating rod of the open front end 8 of the handle body 1. The folded leaf spring with the button 21 thereon may then be easily removed from the cutout 16 of the blade supporting member 4 so that the operating rod 7 with the coil spring 6 thereon may be pulled out of the bore of the blade supporting member 4.

It will be understood that each of the elements described above, or two or more together, may also find a useful application in other types of knife handle for exchangeable blade differing from the types described above.

While the invention has been illustrated and described as embodied in knife handle for exchangeable blade especially for surgical purpose, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Knife handle for exchangeable blade, especially for surgical purpose, comprising, in combination, elongated handle means; first blade engaging means on said handle means and adapted to extend through an aperture in a blade to be exchangeably connected to the handle, said first engaging means having a first abutment surface extending transverse to the elongation of said elongated handle means; elongated operating means connected to said handle means for relative sliding movement in longitudinal direction with respect thereto; second blade engaging means on said operating means spaced in said direction from said first engaging means and adapted to extend through the apertured blade, said second blade engaging means having a second abutment surface extending transverse to said longitudinal direction and facing away from said first abutment surface; spring means operatively connected to said handle means and to said operating means and biased to move the latter in said longitudinal direction so as to move said second abutment surface away from said first abutment surface; and an operating portion on said operating means engageable by the user of the handle to move said operating means in longitudinal direction against the force of said spring means in a direction in which said abutment surfaces approach each other so that said engaging means may be extended through the apertured blade, whereby upon subsequent release of said operating portion said blade will be held by said abutment surfaces engaging opposite longitudinally spaced aperture portions in the blade.

2. Knife handle for exchangeable blade, especially for surgical purpose, comprising, in combination, elongated handle means having a front end, a rear end, and a portion rearwardly of said front end formed with a longitudinal bore extending therethrough; first blade engaging means on said front end and adapted to extend through an aperture in a blade to be exchangeably connected to the handle, said first engaging means having an abutment surface extending transverse to the elongation of said handle means and facing away from said rear end; an operating rod slidably extending through said bore and having a front end rearwardly spaced from said front of said handle means and a rear operating end projecting beyond said rear end of said handle means; second blade engaging means on said front end of said rod adapted to extend through the apertured blade, said second blade engaging means having a second abutment surface extending transverse to the elongation of said rod and facing toward said rear operating end thereof; and spring means operatively connected to said handle means and said operating rod, said spring means biased to move said abutment surfaces away from each other, whereby through pressure on said rear operating end of said rod said abutment surfaces may be moved toward each other against the force of said spring means to a distance smaller than the distance between opposite longitudinally spaced aperture portions in the blade so that said engaging means may be extended through the apertured blade and so that upon release of said operating end portion the blade will be held on said abutment surfaces.

3. Knife handle for exchangeable blade, especially for surgical purpose, comprising, in combination, an elongated handle body formed with a bore extending in longitudinal direction therethrough; an elongated blade supporting member having a front portion projecting beyond one end of said handle body and having a rear portion located in said bore of said handle body; releasable fastening means cooperating with said handle body and said blade supporting member for releasably securing said member to said body; a first holding nose fixed to said front portion of said blade supporting member and adapted to extend through an aperture in the blade, said first holding nose having a first abutment surface extending transverse to the elongation of said blade supporting member and facing away from said rear portion thereof; an operating rod slidably extending through said bore of said handle body and having a front portion rearwardly spaced from said front portion of said blade supporting member and a rear operating portion projecting beyond the other end of said handle body; a second holding nose fixed to said front portion of said operating rod and adapted to extend through the apertured blade, said second holding nose having a second abutment surface extending transverse to the elongation of said rod and facing away from said first abutment surface; and spring means operatively connected to said elongated blade supporting member and said operating rod, said spring means biased to move said abutment surfaces away from each other, whereby through pressure on said rear operating end of said rod said abutment surfaces may be moved toward each other against the force of said spring means to a distance smaller than the distance between opposite longitudinally spaced aperture portions in the blade so that said engaging means may be extended through the apertured blade and so that upon release of said operating end portion the blade will be held on said abutment surfaces.

4. Knife handle for exchangeable blade, especially for surgical purpose, comprising, in combination, an elongated handle body formed with a first bore extending in longitudinal direction therethrough and with a second bore extending adjacent one end of said body transversely to said first bore; an elongated blade supporting member having a front portion projecting beyond said one end of said handle body and having a rear portion located in said bore of said handle body; releasable fastening means cooperating with said handle body and said blade supporting member for releasably securing said member to said body and comprising a button extending through said second bore in said body and into a cutout formed in said blade supporting member, and a spring engaging said button and biased to keep a portion of the same in said second bore; a first holding nose fixed to said front portion of said blade supporting member and adapted to extend through an aperture in the blade, said first holding nose having a first abutment surface extending transverse to the elongation of said blade supporting member and facing away from said rear portion thereof, an operating rod slidably extending through said bore of said handle body and having a front portion rearwardly spaced from said front portion of said blade supporting member and a rear operating portion projecting beyond the other end of said handle body; a second holding nose fixed to said front portion of said operating rod and adapted to extend through the apertured blade, said second holding nose having a second abutment surface extending transverse to the elongation of said rod and facing away from said first abutment surface; and spring means operatively connected to said elongated blade supporting member and said operating rod, said spring means biased to move said abutment surfaces away from each other, whereby through pressure on said rear operating end of said rod said abutment surfaces may be moved toward each other against the force of said spring means to a distance smaller than the distance between opposite longitudinally spaced aperture portions in the blade so that said engaging means may be extended through the apertured blade and so that upon release of said operating end portion the blade will be held on said abutment surfaces.

5. Knife handle for exchangeable blade, especially for surgical purpose, comprising, in combination, an elongated handle body formed with a first bore extending in longitudinal direction therethrough and with a second bore extending adjacent one end of said body transversely to said first bore, said first bore having at least at said one end of said body a non-circular cross section; an elongated blade supporting member having a front portion projecting beyond said one end of said handle body and having a rear portion located in said bore of said handle body, said rear portion of said blade supporting member having a cross section cooperating with said non-circular cross section of said first bore to prevent turning of said blade supporting member relative to said handle body, said rear portion being formed with a cutout; releasable fastening means cooperating with said handle body and said blade supporting member for releasably securing said member to said body and comprising a button extending through said second bore in said body and into said cutout formed in said blade supporting member, and a leaf spring located in said cutout engaging said button and biased to keep a portion of the same in said second bore; a first holding nose fixed to said front portion of said blade supporting member and adapted to extend through an aperture in the blade, said first holding nose having a first abutment surface extending transverse to the elongation of said blade supporting member and facing away from said rear portion thereof; an operating rod slidably extending through said bore of said handle body and having a front portion rearwardly spaced from said front portion of said blade supporting member and a rear operating portion projecting beyond the other end of said handle body; a second holding nose fixed to said front portion of said operating rod and adapted to extend through the apertured blade, said second holding nose having a second abutment surface extending transverse to the elongation of said rod and facing away from said first abutment surface; and spring means operatively connected to said elongated blade supporting member and said operating rod, said spring means biased to move said abutment surfaces away from each other, whereby through pressure on said rear operating end of said rod said abutment surfaces may be moved toward each other against the force of said spring means to a distance smaller than the distance between opposite longitudinally spaced aperture portions in the blade so that said engaging means may be extended through the apertured blade and so that upon release of said operating end portion the blade will be held on said abutment surfaces.

6. Knife handle for exchangeable blade, especially for surgical purpose, comprising, in combination, an elongated handle body formed with a bore extending in longitudinal direction therethrough; an elongated blade supporting member having a front portion projecting beyond one end of said handle body and having a tubular rear portion located in said bore of said handle body, said front portion having a substantially plane longitudinally extending side face; releasable fastening means cooperating with said handle body and said blade supporting member for releasably securing said member to said body; a first holding nose projecting from a front end of said side face of said blade supporting member and adapted to extend through an aperture in the blade, said first holding nose having a first abutment surface extending transverse to the elongation of said blade supporting member and facing away from said rear portion thereof; an operating rod slidably extending through said tubular rear portion of said blade supporting member and said bore of said handle body and having a front portion rearwardly spaced from said front portion of said blade supporting member and a rear operating portion projecting beyond the other end of said handle body; a second holding nose fixed to said front portion of said operating rod and adapted to extend through the apertured blade, said second holding nose having a second abutment surface extending transverse to the elongation of said rod and facing away from said first abutment surface; and spring means operatively connected to said elongate blade supporting member and said operating rod, said spring means biased to move said abutment surfaces away from each other, whereby through pressure on said rear operating end of said rod said abutment surfaces may be moved toward each other against the force of said spring means to a distance smaller than the distance between opposite longitudinally spaced aperture portions in the blade so that said engaging means may be extended through the apertured blade and so that upon release of said operating end portion the blade will be held on said abutment surfaces.

7. Knife handle for exchangeable blade, especially for surgical purpose, comprising, in combination, an elongated handle body formed with a first bore extending in longitudinal direction therethrough and with a second bore extending adjacent one end of said body transversely to said first bore, said first bore having at least at said one end of said body a non-circular cross section; an elongated blade supporting member having a front portion projecting beyond said one end of said handle body and a tubular rear portion located in said bore of said body, said front portion having a substantially plane longitudinally extending side face and said rear portion having a cross section cooperating with said non-circular cross section of said first bore to prevent turning of said blade supporting member relative to said handle body, said rear portion being formed with a cutout; releasable fastening means cooperating with said handle body and said blade supporting member for releasably securing said member to said body, said fastening means including a button extending through said second bore of said body and into said cutout in said blade supporting member, and a leaf spring located in said cutout, engaging said button and tending to keep a portion thereof in said second bore; a first holding nose laterally projecting from said side face of said front portion of said elongated blade supporting member and adapted to extend through an aperture in a blade to be exchangeably connected to the handle, said first holding nose having a first abutment face extending transverse to the elongation of said blade supporting member and facing away from said rear end thereof; an operating rod slidably extending through said tubular rear portion of said elongated blade supporting member and said first bore in said handle body and having a front portion rearwardly spaced from said front portion of said elongated blade supporting member and rear operating portion projecting beyond the other end of said handle body, said front portion of said rod having a substantially plane longitudinally extending side face located substantially in one plane with said side face of said blade supporting member and said leaf spring of said fastening means engaging said side face of said rod for keeping the same aligned with said side face of said blade-supporting member; a second holding nose projecting laterally from said side face of said operating rod and adapted to extend through the apertured blade, said second holding nose having a second abutment surface extending transversely said side face of said rod and facing away from said first abutment surface; and spring means operatively connected to said elongated blade supporting member and said operating rod, said spring means biased to move said abutment surfaces away from each other, whereby through pressure on said rear operating end of said rod said abutment surfaces may be moved toward each other against the force of said spring means to a distance smaller than the distance between opposite longitudinally spaced aperture portions in the blade so that said engaging means may be extended through the apertured blade and so that upon release of said operating end portion the blade will be held on said abutment surfaces.

8. A knife handle as set forth in claim 3 in which said elongated handle body is formed at opposite longitudinal outer surface portions thereof respectively with a pair of depressions.

9. A knife handle as set forth in claim 6 in which an additional holding nose is provided on said elongated blade supporting member rearwardly spaced from said first holding nose and projecting from said side face thereof, and in which said first and said additional holding noses are each provided with a transverse slot open toward the front end of said blade supporting member and in which said first abutment surface and an additional abutment surface are respectively formed at the bottom faces of said slots.

10. A knife assembly with exchangeable blade, especially for surgical purpose, comprising, in combination, a blade having an abutment portion formed with an elongated slot extending in longitudinal direction of said blade, said slot having a pair of opposite spaced face portions extending transverse to the elongation of said slot; elongated handle means having a front end, a rear end, and a portion rearwardly of said front end formed with a longitudinal bore extending therethrough; first blade engaging means on said front end extending through said slot in the blade and having an abutment surface extending transverse to the elongation of said handle means, facing away from said rear end thereof and engaging one of said face portions of said slot; and operating rod slidably extending through said bore and having a front end rearwardly spaced from said front end of said handle means and a rear operating end projecting beyond said rear end of said handle means; second blade engaging means on said front end of said rod extending through said slot, said second blade engaging means having a second abutment surface extending transverse to the elongation of said rod and facing toward said rear operating end thereof and engaging the other of said face portions of said slot; and spring means operatively connected to said handle means and said operating rod and biased to move said abutment surfaces away from each other so as to resiliently press said second abutment surface against said other face portion of said slot to hold thereby said blade on said handle means, whereby upon exertion of pressure on said rear operating end of said rod said abutment surfaces may be moved toward each other against the force of said spring means to a distance smaller than that of the spacing between said opposite face portions of the slot so that said blade may be removed from said handle means.

11. A knife assembly with exchangeable blade as set forth in claim 10 in which said blade is formed instead of said slot with a pair of apertures of preselected cross section and spaced from each other in longitudinal direction of said blade, and in which said blade engaging means have at least in longitudinal direction a cross section smaller than that of said apertures and in which said blade engaging means extend respectively through said apertures.

References Cited by the Examiner

UNITED STATES PATENTS

| | | | |
|---|---|---|---|
| 1,624,640 | 4/27 | Tietz | 30—339 |
| 1,645,685 | 10/27 | Boil | 30—339 |

WILLIAM FELDMAN, *Primary Examiner.*